United States Patent [19]

Wu et al.

[11] 4,306,577

[45] Dec. 22, 1981

[54] REACTION FLAVORS FOR SMOKING PRODUCTS

[75] Inventors: D. Louise S. Wu; James W. Swain, both of Richmond, Va.

[73] Assignee: Philip Morris Incorporated, New York, N.Y.

[21] Appl. No.: 29,244

[22] Filed: Apr. 12, 1979

[51] Int. Cl.$^3$ .................. A24B 3/12; C08G 18/08; C08G 18/18; C08G 77/06

[52] U.S. Cl. .................. 131/276; 131/275; 131/274; 536/53; 536/18

[58] Field of Search .............. 731/17 R, 144; 536/53, 536/18

[56] References Cited

U.S. PATENT DOCUMENTS

| | | | |
|---|---|---|---|
| 2,286,639 | 6/1942 | Elsmere | 131/352 |
| 3,478,015 | 11/1969 | Onishi | 131/17 R |
| 3,722,516 | 3/1973 | Suwa et al. | 131/17 R |
| 3,920,026 | 11/1975 | Warfield et al. | 131/17 R |

FOREIGN PATENT DOCUMENTS

| | | | |
|---|---|---|---|
| 46-923971 | 3/1971 | Japan | 131/144 |
| 48-339873 | 4/1973 | Japan | 131/144 |

OTHER PUBLICATIONS

Hodge, "*Chemistry of Browning Reactions in Model Systems*," J. Agr. Food Chem., vol. 1, No. 15, 10/14/53, pp. 928–943.

*Nitrogen Components of Leaf and Their Relationship to Smoking Quality and Aroma*, Leffingwell, Recent Advances in Tobacco Science, vol. 2, pp. 1–31, 1976.

Koehler et al., J. Agr. Chem., vol. 18, No. 5, 1970, pp. 895–898.

Koehler et al., J. Agr. Food Chem., vol. 17, No. 2, Mar.–Apr. 1969, pp. 393–396.

*Primary Examiner*—V. Millin
*Attorney, Agent, or Firm*—Susan A. Hutcheson; Arthur I. Palmer, Jr.; Nelson A. Blish

[57] ABSTRACT

Reaction flavors for smoking compositions are disclosed. The flavors are prepared by reacting reducing sugars and selected amino acids in the presence of ammonium hydroxide and optionally in the presence of an aldehyde in an essentially solvent-free system. The thus prepared flavors may be incorporated in tobacco, reconstituted tobacco, non-tobacco substitutes or mixtures thereof.

12 Claims, No Drawings

REACTION FLAVORS FOR SMOKING PRODUCTS

DESCRIPTION

BACKGROUND OF THE INVENTION

The present invention relates to reaction flavors and more specifically to reaction flavors suitable for use in smoking products. The invention is also concerned with processes for preparing the reaction flavors and their subsequent incorporation into smoking compositions and particularly reconstituted tobacco.

The increased demand for low delivery smoking products has necessitated a need for redesigning flavor systems compatible with these products. Low delivery smoking products are generally designed to deliver 15 mg of tar or less. Tar is generally defined as the total particulate matter (TPM) that is collected on a Cambridge filter minus the nicotine and water content. Manufacture of low delivery products is generally achieved by use of highly efficient ventilated filters, porous wrappers, modified tobacco blends, and the like. The use of porous wrappers and/or ventilated filters results in considerable air dilution of the smoke with a concomitant dilution of flavorants entrained in the smoke. In order to overcome the problem of "flavor dilution" new systems for flavor incorporation are required.

It is generally recognized that simply adding additional amounts of individual flavorants is not feasible in that pronounced "pack aroma" usually results. Moreover, addition of excessive flavorants to smoking materials may result in increased density of the materials and a decrease in the filling capacity thereof. A flavor system for low delivery cigarettes having increased impact and "full body" is therefore desirable to overcome the presently recognized problems. Since reconstituted tobacco is an ideal filler for low delivery cigarettes, it is of utmost importance that flavor systems be designed that are capable of overcoming the "stemmy" taste generally associated with some reconstituted tobaccos. Moreover, it is necessary to design a system wherein the flavorants may be added in extremely low amounts and still maintain the desired flavor level and physical characteristics described above.

The reaction of sugars and amino acids to produce desirable flavorants for smoking materials has generated increased interest. For example, U.S. Pat. No. 3,478,015 describes "browning reactions" in which an amino acid and a sugar having an active carbonyl are reacted in a lower alkyl polyhydric alcohol solvent in the absence of water at a temperature less than 90° C. for about 5 to 15 hours. The resultant reaction mixture is applied in an amount of about 1% by weight to tobacco.

U.S. Pat. No. 3,920,026 describes tobacco flavorants prepared by reacting valine with a carbonyl compound selected from sugars, dihydroxy acetone, or pyruvaldehyde. The reaction takes place in a solvent such as glycerol or propylene glycol and at a temperature between about 120° and 200° C., and preferably at about 150° to 160° C. for 0.5 to 5 hours depending on the type of sugar used. Flavanoid catalysts, such as quercetin or rutin or a hydroxyacid such as ascorbic acid, may be used. The reaction mixture may be applied directly on tobacco or may be fractionated to separate the volatile and nonvolatile fractions, which are then used as tobacco flavorants.

U.S. Pat. No. 3,722,516 discloses the addition of dihydroxyacetone alone or in combination with amino acids to enhance the natural flavor characteristics of tobacco, and especially the caramel-like or burned sugar-like aroma thereof.

Japanese Pat. No. 9239/71 discloses certain tobacco "perfumes" such as 1-deoxy-1-L-prolino-D-fructose, which is a sugar-amino acid condensation product. This compound, as well as others, are prepared by reacting an amino acid with a sugar in an aqueous or alcohol solvent, and usually in the presence of an acid catalyst such as malonic acid. The desired compounds may be separated and purified by the use of ion-exchange resins and are thereafter applied to tobacco.

Japanese Pat. No. 3398/73 discloses certain other specific amino acid-sugars such as 1-deoxy-1-L-alanino-D-fructose that are synthesized from their respective components by the Amadori rearrangement, in the presence of malic acid as catalyst, by heating at 130° C. for 15 minutes. The specific compounds are isolated and may be combined with cocoa to produce tobacco flavorants.

Two articles by Koehler (*Journal of Agricultural Food Chemistry*, Volume 17, Number 2, pages 393-396, 1969 and ibid., Volume 18, Number 5, pages 895-898, 1970) discuss pyrazine formation in sugar-amino acid model systems. The normal model system consisted of asparagine and glucose reactants in a 1 to 1 molar ratio. Diethylene glycol solvent and a small amount of water were also used. The mixture was heated for 24 hours at 120° C. The use of a base catalyst, such as sodium hydroxide or ammonium hydroxide, resulted in an increase in the production of volatile alkylated pyrazines. In some instances, the addition of an aldehyde, such as acetaldehyde, appeared to increase pyrazine formation. Koehler's work was related to browning reactions known to occur in foods such as roasted peanuts, coffee, cocoa, and potato chips; and has primary object was to determine the chemical factors involved in volatile pyrazine formation during these reactions. Although volatile pyrazines were isolated and identified, there is no suggestion by Koehler that his reaction mixture would be suitable for use as a tobacco flavorant.

DISCLOSURE OF INVENTION

The invention provides a method for preparing reaction flavors for smoking compositions wherein an amino acid having at least two nitrogens present is reacted with a reducing sugar, preferably in the presence of an aldehyde and in a temperature range of about 90° to about 115° C. The presence of ammonium hydroxide in the reaction mixture has been found to produce desirable reaction products. The invention also provides a filler of smoking material selected from tobacco, reconstituted tobacco, or non-tobacco smoking substitutes having incorporated therein from about 0.001 to 5.0% by weight based on the dry weight of the filler of the reaction flavors prepared by the above-mentioned method.

In a preferred embodiment of the present invention, the reaction flavors may be added to reconstituted tobacco at a relatively low level of about 0.05 to about 5.0% by weight of the tobacco. This represents an unexpected result in that generally, higher levels of additives are required to produce a satisfactory reconstituted tobacco sheet from a subjective viewpoint. A low level application of additives, and particularly flavor additives, to reconstituted tobacco results in a sheet having decreased density and a concomitant increase in filling power. This particular physical characteristic renders the reconstituted tobacco highly suitable for use in low delivery cigarettes at a blend level up to 100% if desired.

Smoking compositions having the thus prepared reconstituted tobacco sheet incorporated therein generally will deliver less total particulate matter on smoking. The sheet is more economical for use in making smoking products in that less sheet is required per cigarette on a weight basis. Moreover, increased amounts of reconstituted tobacco may be utilized in the final product because the present reaction flavors overcome or alter the "steamy" taste frequently associated with prior reconstituted tobacco products.

BEST MODE FOR CARRYING OUT THE INVENTION

Amino acids, containing at least two nitrogens, are reacted with a reducing sugar in an essentially solvent-free system. Suitable reducing sugars include glucose, fructose, mannose, galactose, or mixtures thereof, with concentrated fructose syrups being preferred. Disaccharides and polysaccharides may also be used as the source of reducing sugar as long as they are converted to monosaccharides by conventional hydrolysis prior to reacting with the other named reagents. Saccharide mixtures such as corn syrup, malt syrup and invert sugar may also be used as long as conversion to monosaccharides preceeds the reaction with amino acids.

Representative amino acids are glutamine, asparagine, and lysine, each of which contains two nitrogen groups, or arginine, which contains a total of four nitrogens. The molar ratio of sugar to amino acid may be in the range of about 1 to 1 to about 7 to 1 and is preferably about 3 to 1. The presence of an aldehyde, such as isovaleraldehyde, pyruvaldehyde, hexanal, acetaldehyde, butryaldehyde or the like, is optional; however, desirable flavorants are obtained when one of the above aldehydes is included in the reaction mixture. Generally, the aldehyde is added in a molar amount based on the sugar in the range of about 0.001 to about 0.07. In addition, the presence of ammonium hydroxide in a molar amount based on the sugar of about 0.001 to about 1.0 appears to enhance the final reaction product. This concept differs from many of the prior art methods in which acid catalysts, such as malonic acid, malic acid, succinic acid, ascorbic acid, and the like, are utilized to increase or enhance condensation of the sugar and amino acid.

The reaction is generally carried out in a flask, preferably one equipped with a reflux condenser to prevent loss of desirable volatiles. The flask and contents may be heated in a steam bath, an oil bath, or the like, and the time necessary to reach the optimum temperature of about 90° to about 115° C. is determined either by the size of the reaction vessel or the temperature of the heating system or both. It is only necessary to reach the desired temperature, i.e. 105°±5° C. and then the reaction is stopped by adding water. In some instances, however, it may be desirable to continue the reaction at about 100°±5° C. for longer periods of time, such as, for example, up to about 3 hours as long as a burnt or off-taste is avoided.

The degree to which the reaction mixture is diluted by water is a matter of choice and may, to some extent, depend upon its ultimate use. Generally a 1 to 1 to about a 5 to 1 dilution with water is sufficient and results in an aqueous flavorant product adaptable for use on any type of smoking material.

The term "smoking composition" includes all forms of tobacco, such as shredded filler, leaf, stem, stalk, homogenized leaf cured, reconstituted cigar binder, piper tobaccos, or reconstituted tobacco in sheet or predetermined forms, which are cast or extruded from "tobacco slurries." In addition, smoking materials may encompass the various smoking substitutes formulated from non-tobacco materials. The smoking substitute may be utilized alone or blended in varying proportions with tobacco components. Representative formulations for non-tobacco smoking materials may be found in U.S. Pat. Nos. 3,529,602; 3,703,177; 3,796,222; 4,019,521; 4,079,742; and references cited therein.

The reaction flavors produced in accordance with the present invention may be applied to the smoking materials by direct spraying methods known in the art. They may also be applied by dispersing or diluting further in a suitable carrier, water for example, or may be directly mixed or otherwise combined with the smoking material. When an aqueous carrier is employed, the mixture is air-dried or otherwise treated to remove the carrier.

The reaction flavors can, if desired, be incorporated in cigarette paper or in filters. However, it will generally be more desirable to incorporate the flavors in the smoking material itself.

In a preferred embodiment, the reaction flavor is added to a concentrated tobacco extract containing water soluble tobacco constituents, humectants, and the like, and thereafter the extract containing the flavors is applied to a fibrous tobacco web as in making reconstituted tobacco. In this particular instance, the amount of reaction flavor added will generally be in the range of 0.05 to about 5.0% by weight of the finished tobacco sheet. The thus prepared reconstituted tobacco may comprise the entire filler for a smoking article or may be blended in varying proportion with other filler materials, such as tobacco strip, stem, and the like or non-tobacco substitutes. When the reaction flavors are applied to a typical tobacco blend, the weight of flavors in the final product will generally represent from about 0.001 to about 3.0% by weight of the total blend. Similar weight amounts may be used in preparing smoking substitutes for use alone or in combination with tobacco blends.

The following examples are illustrative.

EXAMPLE 1

To a round bottom flask equipped with a condenser was added 22.2 grams of a syrup containing 74% fructose by weight (Clinton Corn Sweetners), 13.3 grams asparagine monohydrate (U.S. Biochemicals), 0.1 grams isovaleraldehyde (Aldrich Chemical Company), and 5 grams of approximately 7.4 M ammonium hydroxide. The flask was heated in an oil bath maintained at 160° C. When the internal temperature of the reaction mixture reached 105° C., 100 milliliters of water was added. The final weight of the diluted reaction mixture was 138.6 grams and the pH was approximately 7.0.

An aliquot of the reaction flavor solution weighing 13.6 grams was sprayed on 3.0 pounds of reconstituted tobacco sheet to give approximately 1% flavorant solution by weight of the sheet. After drying, the tobacco sheet was shredded and incorporated into a typical tobacco blend at a 20% level by weight. Cigarettes having conventional cellulose acetate filters and designed to deliver about 17 milligrams FTC-tar were fabricated and smoked by an experienced panel of 32 smokers. Cigarettes of a similar blend containing conventionally flavored reconstituted tobacco but having no reaction flavor added were used as controls. The experimental cigarettes were found to be slightly harsher, hotter, and more spicy.

EXAMPLE 2

The same weight amounts of reactants used in Example 1 were combined except that isovaleraldehyde was excluded. The mixture, in a round bottom flask, was heated to a temperature of 105° C. using an oil bath maintained at 160° C. One hundred milliliters of water was immediately added and the mixture was cooled. The total weight of the reaction mixture was 138.4 grams and the pH was 7.0.

The reaction flavor solution was sprayed on reconstituted tobacco at the same level as in Example 1, and cigarettes containing 20% of the treated tobacco in a typical blend were then fabricated, smoked and compared with the identical control cigarette as before. The experimental cigarette was slightly more spicy than the control, but lacked some of the "impact" usually associated with sensory descriptive terms such as harshness.

EXAMPLE 3

In a manner similar to Example 1, 250 grams of a 74% fructose syrup, 30 grams of asparagine, 2.5 grams of isovaleraldehyde, and 25 grams of approximately 7.4 M ammonium hydroxide were combined in a round-bottom flask equipped with a condenser. The contents of the flask were heated until the internal temperature reached 105° C. (18 minutes) at which time the reaction was stopped by adding 500 milliliters of water. An identical run was repeated using the same amount of reagents. The total yield of diluted reaction flavors was 1603.75 grams. Equal weight aliquots of the two runs were combined and added to a concentrated aqueous tobacco extract. The extract was then applied to a base-web of tobacco fiber, as in making reconstituted tobacco, in such a manner that the final sheet contained 1% by weight of the sheet of the reaction flavor solution.

The dried reconstituted tobacco sheet was shredded, and cigarettes with cellulose acetate filters were made containing 100% of the flavored shredded sheet. Subjective smoking data is tabulated following Example 4.

EXAMPLE 4

The experiment of Example 3 was repeated in an identical manner with the exception that 50 grams instead of 30 grams of asparagine was used. The total yield from two runs was 1645 grams. Equal aliquots from the two runs were combined and added to a concentrated tobacco extract. The extract was applied to a tobacco web as in Example 3 to give a final concentration of 1% of reaction flavor solution by weight of the reconstituted tobacco sheet. Cigarettes containing 100% of the treated tobacco sheet filler were smoked by an experienced panel of smokers and compared to the cigarettes as made in Example 3. The results are tabulated below. The cigarette of Example 3 was coded A, and the cigarette of Example 4 was coded B.

TABLE 1

| Panelist | Cigarette A | Cigarette B |
| --- | --- | --- |
| 1 | more spicy, slightly sour | smoother, less spicy, |

TABLE 1-continued

| Panelist | Cigarette A | Cigarette B |
| --- | --- | --- |
|   |   | preferred |
| 2 | more stinging, sharp, imbalanced | preferred |
| 3 | hotter | smoother, preferred |
| 4 | hotter, more stinging | better flavor, preferred |
| 5 | no difference | no difference |

The results indicate that 4 out of 5 smokers preferred Cigarette B. In similar subjective smoking tests wherein the blend of the experimental cigarettes contained 20% of the reconstituted tobacco as prepared in Examples 3 and 4, 21 out of 33 panelists preferred the cigarette containing reconstituted tobacco as prepared in Example 4.

EXAMPLE 5

Cigarettes were fabricated using a typical blend of tobaccos including 20% by weight of the total blend of reconstituted tobacco as prepared in Example 4. Conventional cellulose acetate filters were attached to the rods, and the cigarettes were smoked by a panel of 29 experienced smokers. Control cigarettes were made using a similar blend with the exception that the 20% reconstituted tobacco had been treated with a conventional flavoring system. Of the 29 smokers, 18 preferred the cigarette containing the reconstituted tobacco of Example 4, 9 preferred the conventionally flavored reconstituted tobacco, and 2 indicated no preference.

EXAMPLE 6

An aliquot of the reaction mixture as prepared in Example 4 was sprayed on reconstituted tobacco sheet to give a concentration of 1% by weight of the sheet. After drying, the treated sheet was shredded and combined with a tobacco blend to a level of 20% by weight of the total blend. Cigarettes coded A were fabricated and cellulose acetate filters were attached. The cigarettes were smoked by a panel of 41 smokers and compared to cigarettes coded B, which contained 20% reconstituted tobacco in the blend. The reconstituted tobacco of Cigarette B was obtained by adding the reaction mixture, as prepared in Example 4, to the concentrated tobacco extract and thereafter applying the extract to a tobacco base web.

Cigarette A was found to be harsher, more spicy, and hotter. Cigarette B was found to have a higher mean rating on the 9-point acceptability scale wherein a rating of 1 indicates "dislike extremely" and 9 indicates "like extremely." Of the 41 smokers, 23 preferred the Cigarette B and 4 smokers indicated no preference.

EXAMPLE 7

Cigarettes coded A and targeted to deliver approximately 5 milligrams FTC-tar were fabricated using a blend containing 50% by weight of reconstituted tobacco as prepared in Example 4. Cellulose acetate filters designed to achieve 50% dilution of the smoke were attached to the tobacco rods. The cigarettes contained no additional flavorants other than those present in the reconstituted tobacco. Identical cigarettes coded B but containing 50% by weight of conventionally flavored reconstituted tobacco in the identical blend formulation were made and used as controls. On smoking, the panelists found Cigarette A to have more total taste, more tobacco-like flavor, and a higher mean rating on the 9-point flavor intensity scale and acceptability scale. This subjective smoking test indicates that the reaction flavors, when incorporated in reconstituted tobacco, are capable of providing satisfying flavor to the smoker and particularly at lower delivery, high dilution levels.

EXAMPLE 8

A mixture of 50 grams of 74% fructose syrup, 10 grams asparagine, 0.5 gram isovaleraldehyde, and 5 grams of 7.4 M ammonium hydroxide was heated in a steam jacketed flask for 3 hours. A reflux condenser was used to minimize loss of volatiles. After 3 hours, 100 milliliters of water was added to the mixture to stop the reaction. An aliquot of the diluted reaction mixture was sprayed on reconstituted tobacco to give a concentration of 1% by weight of the final sheet. Cigarettes coded A were fabricated containing 20% of the treated reconstituted tobacco and were compared by a panel of smokers with a commercial product coded B and having a similar blend with the exception that the reconstituted tobacco contained conventional flavor additives. The experimental reconstituted tobacco product did not differ significantly from conventionally flavored reconstituted tobacco.

EXAMPLES 9 THROUGH 11

A variety of reaction mixtures utilizing different amino acids, or combinations thereof, and/or different aldehydes were prepared. In each instance, the mixture was heated to 105° C. and was then diluted with 100 cubic centimeters water. Experimental cigarettes containing reconstituted tobacco without flavor were injected with 10 μl of the diluted reaction mixture and were then smoked by a small panel. Table 2 below lists the reactants used, as well as the subjective smoking results.

the reaction was heated to 105° C. and then diluted by adding 100 milliliters water. The reaction mixture was then sprayed on reconstituted tobacco to give approximately 1% flavorant by weight of the sheet. Cigarettes containing 20% of the treated reconstituted tobacco by weight of the total blend were made. Alternatively, the total blend was treated by injecting approximately 10 μl into conventionally cased cigarettes. The results are indicated in Table 3.

TABLE 3*

|  | Amino Acid | Mode of Application | Comments on Smoking* |
|---|---|---|---|
| Cigarette A | Glutamine | spray on reconstituted tobacco | hot and spicy |
| Cigarette A (after 2 weeks aging) | Glutamine | spray on reconstituted tobacco | smoother, slightly fuller flavor |
| Cigarette B | Arginine | inject total blend | smooth, less bitter, more balanced flavor |
| Cigarette C | Lysine | inject total blend | better flavor, slightly smoother |
| Cigarette D | Glutamine 5 grams Asparagine 5 grams | inject total blend | good balance, smoother |

*All experimental cigarettes were smoked and compared to control cigarettes containing unflavored reconstituted tobacco.

EXAMPLE 13

Using the same formulation and reaction conditions of Example 12 wherein the amino acid was asparagine, an additional ingredient consisting of 0.1 gram hexanal was added prior to the heating step. After diluting with water, 10 μl of the reaction mixture was injected into cigarettes prepared from a typical blend of cased tobaccos. On smoking, the cigarettes were found to have more flavor and impact than an untreated control cigarette.

EXAMPLE 14

To a round bottom flask was added 50 grams of a syrup containing approximately 35% glucose and 30% fructose, 10 grams asparagine, 1 gram valine, 0.5 gram isovaleraldehyde, 5 grams of 7.4 M ammonium hydroxide and 0.1 gram propionaldehyde. The reactants were heated in a 160° C. oil bath until the internal temperature of the mixture reached 105° C. The hot reaction mixture was diluted with 100 milliliters of water. Approximately 10 μl of the diluted reaction mixture was injected into test cigarettes. On smoking, the treated cigarettes were found to be slightly harsh and bitter.

EXAMPLE 15

A series of reactions were run using the following formulations:

TABLE 2

| Example Number | Weight of 74% Fructose Syrup (grams) | Weight of Amino Acid (grams) | Weight of NH4OH* (grams) | Weight of Aldehyde (grams) | Comments by Smokers |
|---|---|---|---|---|---|
| 9 | 50 | 10 asparagine | 5 | 0.5 isovaleraldehyde 0.5 acetaldehyde | hot, more impact, slightly green taste |
| 10 | 50 | 1 aspartic 1 valine | 10 (undiluted) | 0.5 isovaleraldehyde 0.5 isobutyraldehyde | strong, astringent, fatty acid taste |
| 11 | 50 | 10 lysine 1 valine | 5 | 0.5 isovaleraldehyde | bitter, harsh, unpleasant, aftertaste |

*NH4OH diluted 1 to 1 unless otherwise noted.

EXAMPLE 12

Several experiments were run using a basic formulation that consisted of 50 grams of a 74% fructose syrup, 10 grams amino acid, 0.5 gram isovaleraldehyde, and 5 grams of 7.4 M ammonium hydroxide. In each instance,

| (a) Reducing sugar | 25.0 | grams of glucose, mannose or galactose or mixtures thereof |
| (b) Asparagine | 5.0 | grams |

|   |   |   |
|---|---|---|
| (c) Isovaleraldehyde | 0.25 | grams |
| (d) 7.4 M NH₄OH | 2.5 | grams |

In each instance, the reactants were heated to about 105° C. and then diluted with 100 milliliters of water. Smoking materials treated with the resulting reaction products were found to have improved flavor and impact on smoking.

We claim:

1. A process for preparing a reaction flavor which comprises reacting a reducing sugar with an amino acid having at least two nitrogen atoms, said amino acid being selected from the group consisting of asparagine, glutamine, arginine and lysine, in an essentially solvent-free basic system and heating for a period of time sufficient to reach a temperature in the range of about 90° to about 115° C.

2. The process of claim 1 which further comprises the addition of an aldehyde selected from the group consisting of isovaleraldehyde, pyruvaldehyde, acetaldehyde, butryaldehyde and hexanal prior to heating and in a molar amount based on the reducing sugar of about 0.001 M to about 0.07 M.

3. The process of claim 1 wherein the molar ratio of sugar to amino acid is from about 1 to 1 to about 7 to 1.

4. The process of claim 1 wherein the reducing sugar is selected from the group consisting of fructose, glucose, mannose, galactose and mixtures thereof.

5. The process of claim 1 wherein ammonium hydroxide is added prior to heating and in a molar amount based on the reducing sugar of about 0.001 M to about 1.0 M.

6. The process of claim 2 wherein the reaction flavor is prepared by heating a mixture of fructose, isovaleraldehyde, and asparagine in the presence of ammonium hydroxide for a period of time sufficient to reach a temperature in the range of 100° to about 110° C.

7. A reaction flavor product prepared by the process of claim 6.

8. A smoking composition comprising a filler material selected from tobacco, reconstituted tobacco, non-tobacco smoking substitute and mixtures thereof, and the reaction flavor product of claim 7.

9. The smoking composition of claim 8 comprising a filler of blended tobaccos having incorporated therein between about 0.001 and 3.0% by weight of the tobacco of the reaction flavor product.

10. The smoking composition of claim 8 comprising a filler of reconstituted tobacco having incorporated therein between about 0.05 and 5.0% by weight of the reconstituted tobacco of the reaction flavor product.

11. The smoking composition of claim 8 comprising a filler of a non-tobacco smoking substitute having incorporated therein between about 0.001 and 5.0% by weight of the smoking substitute of the reaction flavor product.

12. The process of claim 1 wherein the reaction system is heated to a temperature in the range of 100°±5° C., and thereafter the reaction is terminated by diluting the said reaction system with water.

* * * * *